Figure 6:
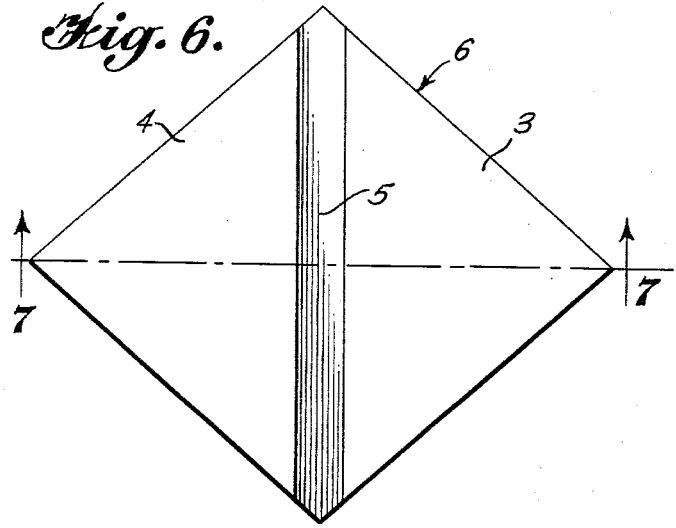

Nov. 23, 1965  S. A. MATZ ETAL  3,219,456
METHOD FOR PRODUCING AN UNBAKED DOUGH PRODUCT
Filed April 11, 1963  2 Sheets-Sheet 1
Fig. 1.
Fig. 2.
Fig. 3.
Fig. 4.
Fig. 5.
INVENTORS
Samuel A. Matz,
Donald E. Mook
BY
ATTORNEY

United States Patent Office 3,219,456
Patented Nov. 23, 1965

3,219,456
METHOD FOR PRODUCING AN UNBAKED
DOUGH PRODUCT
Samuel A. Matz, Liverpool, and Donald E. Mook, De
Witt, N.Y., assignors to The Borden Company, New
York, N.Y., a corporation of New Jersey
Filed Apr. 11, 1963, Ser. No. 272,416
7 Claims. (Cl. 99—92)

This invention relates to the manufacture of improved refrigerated dough products and, more particularly, to improved pre-formed unbaked filled turnovers that can be stored for long periods at normal refrigerator temperatures and still yield baked products having a rigid, crispy, flaky dough covering.

For many years it has been recognized that filled unbaked dough products, manufactured for home baking and consumption, lack several essential properties required to add greater convenience in the home storage and preparation thereof. Moreover, these filled products have generally failed to keep the liquid portion of the filling from soaking into the dough and have lacked the rigid structure needed to prevent sagging. Although the dough and the filling may be resistant to microbiological spoilage when separated due mainly to the low moisture of the one and the low pH of the other, they become very susceptible to attack by mold, bacteria, and yeast at the areas where the filling soaks into the dough. One of the purposes of the present invention is to retain throughout storage the inherent resistance of the individual components. Furthermore, the preparation of products such as turnovers from the basic ingredients has required a large number of preparation steps in the home prior to the baking thereof, this being time consuming and inconvenient. Store purchased unbaked turnovers of the prior art have also included doughy tasting regions, have lacked the desired rigidity, crispiness and flakiness, and have not been capable of being stored at normal refrigerator temperature for extended periods of time without spoilage.

The above enumerated problems are overcome in accordance with the present invention wherein a refrigerated dough product is produced which can be refrigerated at normal refrigerator temperatures for periods of up to eight weeks without spoilage, which exhibits better texture than prior art turnovers due to the presence of a thick upper layer and the use of a thin under layer of dough in the turnover to eliminate any doughy tasting regions after baking, and which is convenient to make due to the elimination of several operations for the housewife by pre-filling the dough shell prior to refrigeration.

It is therefore an object of this invention to provide an improved refrigerated dough product which can be stored at normal refrigerator temperatures for periods of about eight weeks without spoilage.

It is a further object of this invention to provide an improved refrigerated dough product which has improved texture and which eliminates doughy tasting areas.

It is a still further object of this invention to provide an improved refrigerated filled dough product which is easy to prepare and requires less processing steps than similar prior art filled dough products.

It is a further object of this invention to provide a refrigerated filled turnover which is rigid, crispy and flaky when baked and does not permit leaking of the filling while stored in the raw condition.

It is still a further object to provide a method for preparing such refrigerated dough products.

These objects and other objects will become obvious to those skilled in the art by reference to the following detailed description and illustrations of a preferred embodiment of the invention which is provided only for the purpose of explanation by way of example.

Figure 7:
Figure 8:
Figure 9:
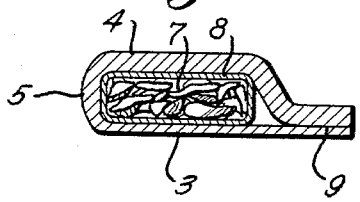
Figure 10:
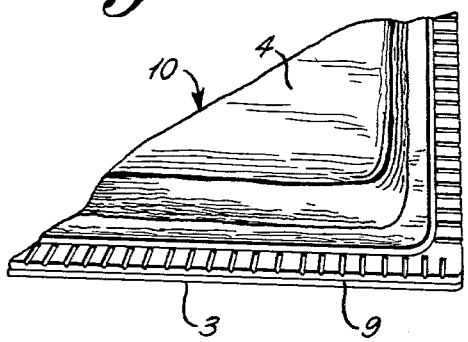

FIGURE 1 is a sectional view of a dough sheet with shortening thereon;
FIGURE 2 is a sectional view of the dough sheet with shortening of FIG. 1 folded into a "sandwich;"
FIGURE 3 is a sectional view of the dough sheet of FIG. 2 after same has been flattened;
FIGURE 4 is a top view of the dough sheet of FIG. 3 after same has passed through variable diameter sheet rollers;
FIGURE 5 is a cross-sectional view taken along the line 5—5 of FIG. 4;
FIGURE 6 is a top view of the dough sheet of FIG. 4 after same has been cut into a diamond shape;
FIGURE 7 is a cross-sectional view taken along the line 7—7 of FIG. 6;
FIGURE 8 is a cross-sectional view of the turnover filling;
FIGURE 9 is a cross-sectional view of the completed turnover;
FIGURE 10 is a perspective view of the completed turnover.

Referring now to the drawings, the dough for the dough piece is prepared by mixing together flour, salt, margarine, sodium benzoate, glucono-delta-lactone and water in predetermined amounts until a homogeneous dough is formed. The dough is then rolled into a thin rectangular sheet 1 and shortening 2 is applied to two-thirds of the surface thereof. The dough is then folded to provide a sandwich configuration which includes three layers of dough 1 and two interleaved layers of shortening 2 (FIG. 2).

The folded dough product of FIG. 2 is then passed through a series of steel rollers, each roller progressively flattening the sandwich until the sandwich has been compressed to a thickness of about one-half inch (FIG. 3). The thinned resultant sheet is then folded to make four layers, the outer fourth on each side of the sheet being folded toward the center and then one of the doubled portions folded over the other doubled portion turned 90° to the previous direction of travel and again passed through the set of sheet rollers. This folding and sheeting operation is repeated. The resultant sheet is then passed through a pair of sheeting rolls of variable diameter (FIGS. 4 and 5) to provide a sheet which includes alternating thin and thick portions 3 and 4, respectively, preferably separated by a connecting portion 5 which gradually increases in thickness from the thin layer 3 to the thick layer 4. The sheet is then cut into diamond-shaped pieces 6 (FIGS. 6 and 7) by a rotary or reciprocating cutter so that about one-half of the diamond consists of a thick dough layer 4 and the other half consists of a thin dough layer 3 connected by portion 5.

The filling is prepared by shaping a prepared pie filling or similar material, preferably of pH 3.5 or less, into the form of a triangle 7 (FIG. 8) having sides of suitable length to fit upon one-half of the diamond, leaving a small border, freezing the shaped filling material until the mass becomes firm, dipping the frozen mass into molten distilled acetylated monoglycerides 8 and allowing the monoglycerides to solidify as a continous enveloping film. Acetylated monoglycerides are formed by (1) interesterification of edible fats with triacetin in the presence of certain catalytic agents followed by molecular distillation, or (2) the direct acetylation of edible monoglycerides with acetic anhydride with the removal of vacuum distillation of acetic acid, acetic anhyride, and triacetin. These products are principally monoglycerides of fatty acids in which one or two of three hydroxyl groups have been acetylated.

The coated filling is placed on the thin part of the dough diamond so that an even margin of dough is visible along the two outer edges of the filling. The thick part of the dough is folded over the filling and the contacting edges of the thick and thin portions are sealed together at 9 (FIGS. 9 and 10) by applying a corrugated roller or similar tool. The turnover 10 is then placed in a foil baking pan, the thin part of the dough piece being in contact with the pan surface. The container is flushed with nitrogen or carbon dioxide gas and immediately hermetically sealed with a film substantially imprevious to the gas used for flushing. In this manner there is produced a packaged dough product which can be stored at normal refrigerator temperatures for about eight weeks without spoilage, which does not contain doughy tasting regions and which can be ultimately baked by the housewife by merely placing same in the oven.

To further illustrate the invention, the following example is presented, which example is not to be considered as limiting of the invention.

*Example*

A dough piece weighing 60 grams and a filling weighing 25 grams were prepared according to the above-described manner as follows:

The dough portion of the product was prepared by mixing together 1000 parts of flour, 15 parts of salt, 250 parts of margarine, 2 parts of sodium benzoate, 6 parts glucono-delta-lacone, and 475 parts water until a homogeneous dough was formed. The dough product was then coated with 50 parts of roll-in type shortening on two-thirds of its upper surface, folded and rolled in the manner described supra and then passed through a variable diameter roll as described supra. The sheet was thereby reduced in thickness to about 6 mm. in some parts and 3 mm. in other parts as described in FIG. 4, said thick and thin parts being united by a portion diminishing in thickness from the greater to the lesser dimension. The sheet was then cut into diamond-shaped pieces which measured about 6 inches in the long axis and 5¼ inches in the short axis by a rotary or reciprocating cutter so that one-half of the diamond consisted of the thick dough layer and the other half consisted of the thin dough layer as shown in FIG. 5.

The filling was prepared by shaping approximately 25 grams of a prepared pie filling having a pH of about 3.5 into the form of a triangle with sides about 2½ inches in length, freezing the shaped material at 0° F. or lower until the mass became firm, dipping the frozen mass in molten Myvacet 5–00 (a distilled acetylated monoglyceride) and allowing the Myvacet 5–00 to solidify as a continuous enveveloping film constituting about 10 percent by weight of the total mass. Myvacet products are derived fats in which acetic acid is one of the fatty acids present. Type 5–00 corresponds to a distilled monoglyceride in which approximately one-half of the free hydroxyl groups have been acetylated. The source fat used in its preparation is hydrogenated lard.

The coated filling was placed on the dough and processed in the manner described supra to provide the finished packaged product.

Experimentation has disclosed the fact that ingredient proportions other than the specific proportions set forth in the above example can be used in the practice of this invention. Based upon 1000 parts of flour, salt was varied from zero to 35 parts, margarine was varied from 100 to 400 parts, glucono-delta-lactone was varied from 5 to 15 parts and water was varied from 300 to 600 parts. The roll-in shortening placed upon two-thirds of the dough surface was varied from 250 to 750 parts. The Myvacet proportions were varied from 1 to 10 percent of the total mass.

The folding and rolling procedures were varied by folding initially to give a "sandwich" of two dough layers and one shortening layer, four dough layers and three shortening layers, or five dough layers and four shortening layers, etc. Dough thickness may be reduced, e.g., to from one-fourth to two inches. Folds may be, e.g., double or triple instead of quadruple. The thick parts of the dough were varied from 4 to 8 mm. in thickness and the thin part may vary from 2 to 4 mm., the ratio of thickness of the thin part to thickness of the thick part varying from 0.33 to 0.66. The dimensions of the diamond dough section were varied from 4 to 8 inches in the long axis and 4½ to 7 inches in the short axis. The filling utilized was varied from 15 to 60 grams. The dimensions of the triangle composed of filling material are always determined by the dimensions of the diamond dough piece. Though the above range of values was used successfully during experimentation, it is obvious that these ranges can be extended even beyond the ranges provided supra. It is therefore to be understood that all ranges and combinations of the above-enumerated ingredients which provide a turnover having the above properties are included herein as part of this invention.

In the above description there has been disclosed an improved refrigerated dough product and method of preparing the same. In essence the invention provides an improved filled turnover by forming a shaped dough sheet having thick and thin portions, placing a filling on the thin portion and folding the thick portion over the filling to produce a leak-resistant, sag-resistant, rigid structure. Though the specific embodiment shown describes the step of first forming a sandwich structure of dough and shortening, it is apparent that this step is not essential to the practice of the invention. Similarly other modifications and variations of the invention disclosed may be made without departing from the spirit and scope thereof. It is therefore intended that such modifications and variations be considered within the scope of the invention as hereinafter defined in the following claims.

We claim:

1. A method of producing an unbaked dough product suitable for storage under refrigeration which comprises the steps of rolling a dough sheet comprising layers of dough having layers of shortening interleaved therebetween into areas of alternating thickness, cutting said sheet into predetermined geometrical shapes each having a portion substantially thicker than a second portion thereof, placing a filling on the second thinner portion and folding said shape so the thicker portion lies over the filling.

2. A process according to claim 1 wherein said portions have an area greater than that of the filling, and the peripheral edges of said portions are pressed together after folding to completely enclose said filling.

3. A method of producing an unbaked dough product suitable for storage under refrigeration which comprises the steps of rolling a dough sheet comprising layers of dough having layers of shortening interleaved therebetween into a series of three areas of different thickness, the first area having the greatest thickness, the third area having the least thickness and an interconnecting second area having a thickness diminishing from the thicker to the thinner, cutting said sheet into predetermined geometrical shapes, each shape containing said three areas of different thickness, placing a filling on said thinner area of the shape, folding the shape along the interconnecting area over said filling to place the thicker area thereon, and pressing the peripheral edges of said thicker and thinner areas into contact with each other to enclose the filling.

4. The process according to claim 3 wherein said thicker and thinner areas are of substantially the same size and the interconnecting area is substantially smaller.

5. The process of claim 3 wherein said first area is about one-third to two-thirds thicker than said third area.

6. A method of producing an unbaked dough product suitable for storage under refrigeration which includes the steps of rolling out a layer of dough, applying shortening to a portion of one surface of the dough, folding the dough and shortening into a sandwich of alternate dough and shortening layers, reducing the thickness of the dough sandwich whereby certain portions of said dough sandwich are of a first reduced thickness and the remaining portions of the dough sandwich are of a second more reduced thickness, cutting a shaped dough structure from said dough so that about half of said shaped structure is composed of portions of said first reduced thickness and the remainder of said shaped structure is composed of portions of said second reduced thickness, coating a frozen filling with an acetylated monoglyceride, placing said filling on said remainder of said structure and enclosing said filler within said dough structure.

7. A method as set forth in claim 6 further including the steps of placing said filled dough structure in a foil baking pan, said remainder of said structure contacting said pan surface and flushing said container with a gas taken from the class consisting of nitrogen and carbon dioxide and hermetically sealing said container.

References Cited by the Examiner

UNITED STATES PATENTS

| | | | |
|---|---|---|---|
| 1,969,361 | 8/1934 | Fajen | 99—86 |
| 2,442,537 | 6/1948 | Eckey | 99—92 |
| 2,547,206 | 4/1951 | Hanau | 99—92 |
| 2,756,459 | 7/1956 | Kellner | 99—172 |

OTHER REFERENCES

Betty Crocker's Picture Cook Book, First edition, 1956, McGraw-Hill Book Company, Inc., New York. TX715C7, pp. 298, 299 and 326 relied upon.

A. LOUIS MONACELL, *Primary Examiner.*

RAYMOND N. JONES, *Examiner.*